United States Patent [19]

Kim

[11] Patent Number: 4,922,176

[45] Date of Patent: May 1, 1990

[54] ELECTRONIC ABSOLUTE COORDINATE ENCODER FOR POSITIONAL CONTROL DEVICES

[75] Inventor: Chul K. Kim, Suwon, Rep. of Korea

[73] Assignee: Samsung Electronics Co., Ltd., Rep. of Korea

[21] Appl. No.: 245,332

[22] Filed: Sep. 16, 1988

[30] Foreign Application Priority Data

Sep. 17, 1987 [KR] Rep. of Korea .............. 1987-15851

[51] Int. Cl.$^5$ .............................................. G05B 19/29
[52] U.S. Cl. ................................... 318/602; 318/602; 318/568; 250/231.16; 250/231.18; 341/6
[58] Field of Search ................... 318/602, 568; 341/6; 250/231 SE

[56] References Cited

U.S. PATENT DOCUMENTS

| | | | |
|---|---|---|---|
| 4,079,251 | 3/1978 | Osann, Jr. ................. | 250/231 SE |
| 4,442,532 | 4/1984 | Takemura ................. | 341/6 |
| 4,491,826 | 1/1985 | Krogh et al. ............. | 341/6 |
| 4,633,224 | 12/1986 | Gipp et al. .............. | 250/231 SE |
| 4,672,279 | 6/1987 | Hosokawa et al. ......... | 318/568 |

Primary Examiner—William M. Shoop, Jr.
Assistant Examiner—Saul M. Bergmann
Attorney, Agent, or Firm—Saidman, Sterne, Kessler & Goldstein

[57] ABSTRACT

An electronic absolute coordinate encoder for positional control devices which includes an encoding section, a detector section, a counter section and a backup power source. The encoder can detect the current position of the positioning system continuously even in case of power interruption and thus the positioning system may not be returned to the original position for the purpose of performing the position control, when the power interruption ends.

2 Claims, 2 Drawing Sheets 4,922,176

ELECTRONIC ABSOLUTE COORDINATE ENCODER FOR POSITIONAL CONTROL DEVICES

BACKGROUND OF THE INVENTION

1. Field of the Invention

The present invention relates to an absolute coordinate encoder for positional control devices such as robots, automatic positioning device, etc., and more particularly, to an electronic absolute coordinate encoder which can continuously monitor and detect the position of the positioning system even in case of power interruption.

2. Description of the Prior Arts

Conventional positional control devices utilizing a driving motor are well known. In such positional control devices, a microcomputer employed as the system controller thereof compares the current position data detected from the positioning system with the destination position data and drives the motor to accelerate or to decelerate based on the difference between the current position and the destination position in order to perform the position control.

However, these conventional positional control devices suffer from the disadvantage that if the power supply is cut off during the position control, the current position data of the positioning system which has been counted by a digital position detector is cleared too. Thus, when the power supply is applied again, the positional control system cannot identify the coordinate of the current position where the positioning system stopped and thus must perform search operation to find the original position of the positioning system before the main position control.

Recently, positional control devices which utilize an absolute coordinate encoder having a rotational disk which is mounted on the shaft of the motor to sense the current position of the positioning system have also been proposed and developed to the initial state of practical use. However, due to the limitation of scaledown of the disk, such devices also have drawbacks that such an absolute coordinate encoder cannot be employed to the devices using a small motor but can be employed only to the devices using a motor of about 300 W or more.

SUMMARY OF THE INVENTION

It is an object of the present invention to provide an electronic absolute coordinate encoder for a positional control device which can detect the current position of the positioning system continuously even in case of power interruption.

The above object is inventively achieved by miniaturizing the constituting circuits with low power consumption elements and by utilizing a backup power source.

According to the present invention, there is provided an electronic absolute coordinate encoder for a positioning control device comprising:

an encoding section sensing the current position of the position system which is driven by the motor and generating first pulse train and second pulse train which is advanced or delayed for a predetermined phase difference relative to the first pulse train in dependence upon the rotating direction of the motor;

a detector section receiving the first and second pulse trains, detecting the rotating direction of the motor according to the phase difference between the first and second pulse trains, and generating alternatively first control signal and a clock pulse train based on the phase difference;

a counter section receiving the clock pulse train and the first control signal, performing forward or reverse counting of the position data of the positioning system in dependence upon the first control signal, and generating the current position data of the positioning system; and a backup power source applying a predetermined power supply to the encoding section, the detector section, and the counter section so that the sections continue to monitor the positioning system and to detect the position data thereof even in case of power interruption.

BRIEF DESCRIPTION OF THE DRAWINGS

The present invention will now be described by way of illustrative example with reference to the accompanying drawings, in which.

DESCRIPTION OF THE PREFERRED EMBODIMENT

Figure 1:
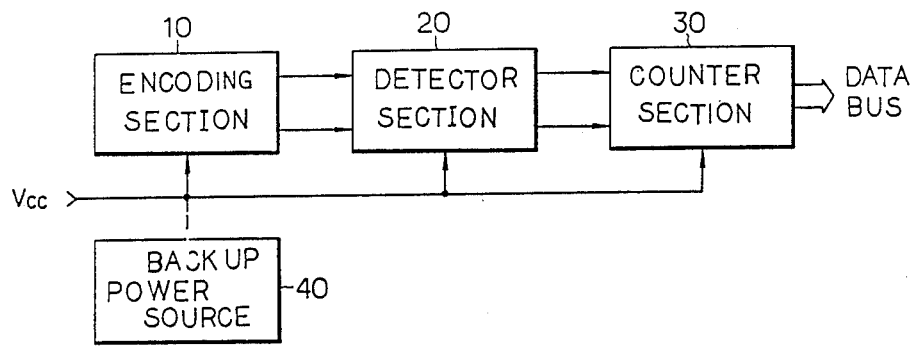
FIG. 1 is a block diagram of an electronic absolute coordinate encoder for a positional control device according to the present invention.
Figure 2:
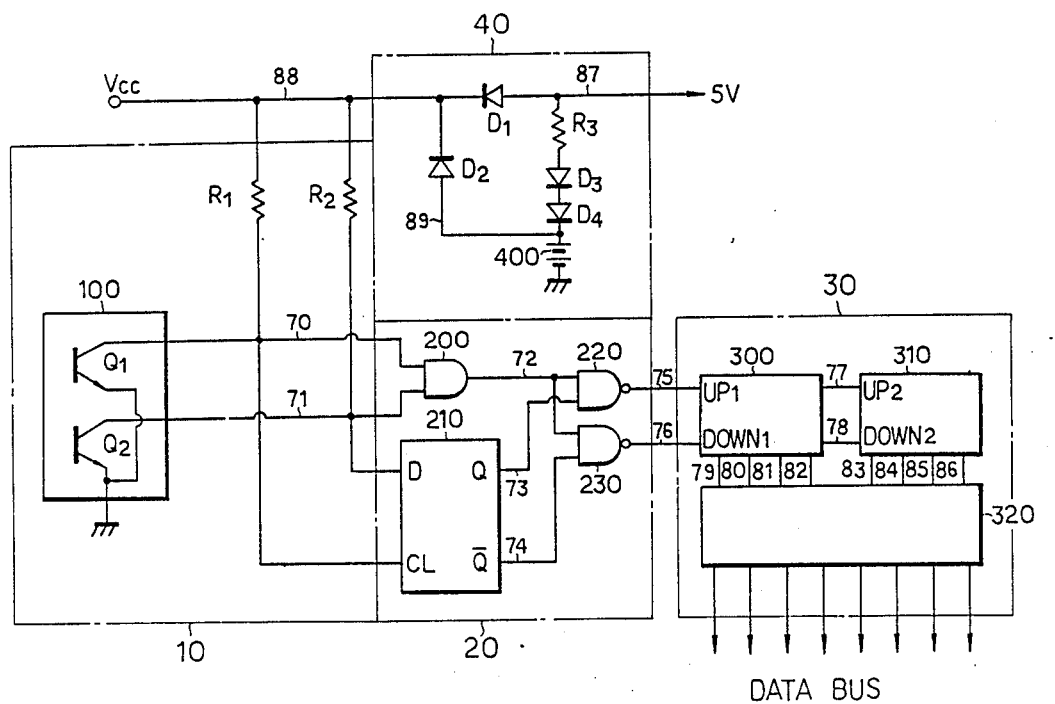
FIG. 2 is a circuit diagram of the embodiment of the present invention.

Referring to FIGS. 1 and 2, the encoding section 10 senses the current position of the positioning system by the rotation of the motor (not illustrated), outputs the first and second pulse trains advanced or delayed for a predetermined phase difference from each other over lines 70 and 71 respectively.

The first and second pulse trains on lines 70 and 72 are applied to the detector section 20. The detector section 20 detects the rotating direction of the motor in dependence upon the phase difference between the two input pulse trains, and outputs the clock pulse train and the first control signal through lines 75 and 76 respectively or through lines 76 and 75 respectively based on the rotating direction.

Then, the counter section 30 performs up-down counting in dependence upon the input clock pulse train and the first control signal on the lines 75 and 76 and outputs the counted data to a data bus.

The backup power source 40 supplies the rated voltage to the sections 10,20, 30 over the line 88 and charges a battery contained therein when the normal power supply is applied. In case that the normal power supply is cut off, the backup power source 40 supplies to the sections 10, 20, 30 the current charged in the battery, the voltage of which is higher than the minumum operational voltage and lower than the rated voltage. Therefore, it is possible that the encoding section 10, the detector section 20 and the counter section 30 monitor and detect the positioning system continuously even in case of power interruption.

The rotational disk (not illustrated) is mounted on the shaft of the motor and has a multitude of slots formed on its periphery, which the light emitted by the light-emitting element (not illustrated) constituting a photocoupler in the encoding section 10 passes through. Thus, the light emitted by the light-emitting element reaches the light-receiving element $Q_1$ discretely due to the rotating of the disk and the light-receiving element $Q_1$ continues ON-OFF operation. The ON-OFF operation of the light-receiving element $Q_1$ controls the power supply $V_{cc}$ through a pull-up resistor $R_1$ connected thereto and thus the first pulse train is generated. Also, the emitted light reaches the light-receiving element $Q_2$, the light-receiving element $Q_2$ continues ON-OFF operation, and the ON-OFF operation of the light-receiving element $Q_2$ controls the power supply $V_{cc}$ through a pull-up resistor $R_2$, resulting in the generation of the second pulse train which is advanced or delayed for a predetermined pulse difference relative to the first pulse train based on the rotating direction of the motor.

The first and second pulse trains on the lines 70 and 71 are fed to an AND Gate 200 in the detector section 20 and accordingly, the output of the AND gate 200 becomes third pulse train which has the pulse width reduced by the phase difference between the first and second pulse trains. The first and second pulse trains are also fed to the input terminal D and the clock input terminal CL of a latch 210 and when every pulse of the first pulse train is applied, the latch 210 latches the logic state of the second pulse train. Thus, the outputs Q and $\overline{Q}$ of the latch 210 become a rotating direction recognition (RDR) signal and an inverted rotating direction recognition ($\overline{RDR}$) signal resepecively. Since the third pulse train from the AND gate 200 on line 72 and the RDR signal from the output Q of the latch 210 on line 73 are applied to first NAND gate 220, the output of the first NAND gate 220 becomes first control signal or the inverted third pulse train in dependence upon the RDR signal. The third pulse train and the inverted RDR signal from the output $\overline{Q}$ of the latch 210 on line 74 are also fed to second NAND gate 230, and the output of the second NAND gate 230 becomes the first control signal based on the $\overline{RDR}$ signal or the inverted third pulse train.

Since the first control signal or the clock pulse train from the first and second NAND gates 220 and 230 is applied to the up or the down terminal of first counter 300, the first counter 300 outputs second control signal which is the same as the first control signal and a carry or a borrow in dependence upon the up-down counting of the clock pulse train. Also, the first counter 300 outputs the lower digits for the current position data of the positioning system over lines 79, 80, 81, 82. Second counter 310 receives the second control signal and the carry or the borrow, and outputs over lines 83, 84, 85, 86 the higher digits for the current position data of the positioning system by performing the up-down counting in dependence upon the second control signal. A buffer 320 receives the lower and higher digits on the lines 79 through 86 and outputs the same to the data bus.

A diode $D_1$ in the backup power source 40 supplies the normal voltage of the main supply to the sections 10, 20, 30. The normal voltage of the main power supply is lowered to the predetermined voltage through a resistor $R_3$ and diodes $D_3$ and $D_4$ and this lowered power supply is charged to a battery 400. Thus, in case of power interruption, the lowered power supply is applied from the battery 400 to the sections 10, 20, 30 through a diode $D_2$.

Figure 3:
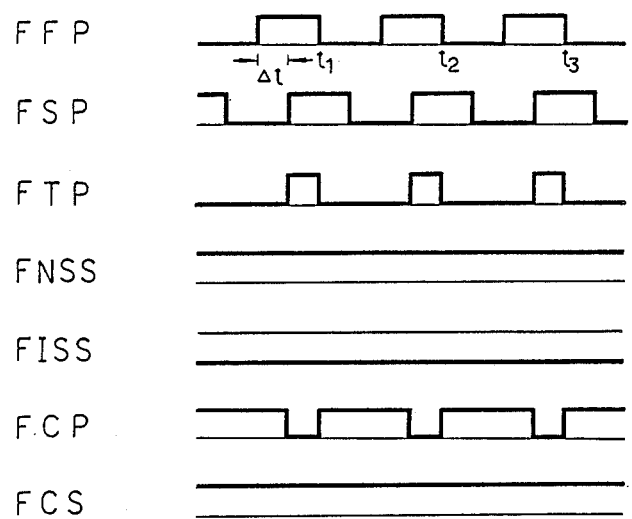
FIG. 3 is a timing chart for depicting the signals appeared at various points in FIG. 2 when the motor rotates clockwise.
Figure 4:
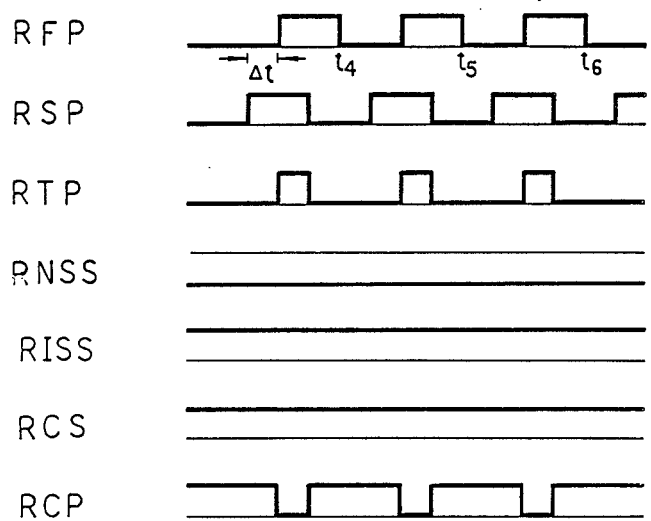
FIG. 4 is a timing chart for dipicting the signals appeared at various points in FIG. 2 when the motor rotates counterclockwise.

Referring now to FIGS. 2, 3 and 4, the embodiment of the present invention will be described in more detail.

In the disclosed embodiment, an encoder 100 is a type of incremental encoder. When the motor rotates clockwise, the light reaches the light-receiving elements $Q_1$ and $Q_2$ discretely due to the rotation of the disc as previously described. Thus, the light-receiving element $Q_1$ in the encoder 100 continues ON-OFF operation and controls the power supply $V_{cc}$ through the pull-up resistor $R_1$ connected to the line 70, causing the first pulse train FFP as shown in FIG. 3 generated over the line 70. On the other hand, the light-receiving element $Q_2$ also continues ON-OFF operation and controls the power supply $V_{cc}$ through the pull-up resistor $R_2$ connected to the line 71, causing the second pulse train FSP in FIG. 3, whose phase is delayed for $\Delta t$ relative to the first pulse train, generated over the line 71.

The first and second pulse train on the lines 70 and 71 are respectively applied to the AND gate 200 and therefore, the AND gate 200 outputs the third pulse train having the pulse width reduced by the phase difference $\Delta t$ between the first and second pulse trains through the line 72, as the output of the AND gate 200 become 'HIGH' only when two input thereof are both in state 'HIGH'.

The first pulse train on the line 70 and the second pulse train on the line 71 are fed to the clock input terminal CL and the input terminal D of the latch 210 respectively and the latch 210 latches the state 'HIGH' of the second pulse train at the time of $t_1$, $t_2$ and $t_3$ as shown in FIG. 3 when the first pulse train makes a transition from state 'HIGH' to 'LOW'. Consequently, the output Q of the latch 210 becomes a clockwise rotating recognition signal FNSS as shown in FIG. 3 which maintains state 'HIGH' and the output $\overline{Q}$ of the latch 210 becomes a counterclockwise rotating recognition signal FISS as shown in FIG. 3 which maintains state 'LOW'.

The third pulse train from the AND gate 200 on the line 72 and the clockwise rotating recognition signal FNSS from the output Q of the latch 210 on the line 73 are applied to the first NAND gate 220. As the output of the NAND gate 220 becomes 'LOW' only when two inputs thereof are both in state 'HIGH', the output of the first NAND gate 220 becomes the clock pulse train FCP as shown FIG. 3 which is, in face, the inverted third pulse train FTP in FIG. 3.

The third pulse train on the line 72 and the counterclockwise rotating recognition signal from the output $\overline{Q}$ of the latch 210 on the line 74 are applied to the second NAND gate 230 and thus the output of the second NAND gate 230 becomes the first control signal FCS as shown in FIG. 3 which maintains 'HIGH' since the counterclockwise rotating signal FISS maintains state 'LOW'.

The first control signal FCS from the NAND gate 230 on the line 76 and the clock pulse train FCP from the NAND gate 220 on the line 75 are fed to the down terminal DOWN1 and the up terminal UP1 of the first counter 300 respectively. Thus, the first counter 300 outputs the second control signal which has the same logic state as the first control signal over the line 78, performs up counting at every clock pulse of the clock pulse train, and in turn outputs the carry over the line 77 and the lower digits for the current position data of the positioning system over the lines 79, 80, 81, 82.

The second control signal on the line 78 and the carry on the line 77 are respectively fed to the down terminal DOWN2 and the up terminal UP2 of the second counter 310. Thus, the second counter 310 performs up counting every time when the carry is applied and outputs the higher digits for the current position data of the positioning system through the lines 83, 84, 85, 86.

Then, the 8 bits lower and higher digits for the current position date on the lines 79 through 86 are applied to the data bus through the buffer 320.

On the other hand, when the motor rotates counterclockwise, the encoder 100 continues ON-OFF operation as previously described, controls the power supply $V_{cc}$ through the pull-up resistor $R_1$, and outputs the first pulse train RFP as shown in FIG. 4 over the line 70. The encoder 100 also controls the power supply $V_{cc}$ through the pull-up resistor $R_2$ and outputs the second pulse train RSP in FIG. 4 over the line 71. In this case, the phase of the second pulse train RSP is advanced for $\Delta t$ relative to the first pulse train RPF.

Since the first and second pulse trains RFP and RSP on the lines 70 and 71 are fed to the AND gate 200, the output of the AND gate 200 on the line 72 becomes the third pulse train RTP in FIG. 4 which has the pulse width reduced by the phase difference $\Delta t$ between the first and second pulse trains.

The second pulse train RSP on the line 72 and the first pulse train RFP on the line 70 are also applied to the input terminal D and the clock input terminal CL of the latch 210 respectively, and thus the latch 210 latches the state 'LOW' of the second pulse train at the time of $t_4$, $t_5$ and $t_6$ as shown in FIG. 4 when the first pulse train makes a transition from state 'HIGH' to 'LOW'. Therefore, the output Q of the latch 210 on the line 73 becomes the counterclockwise rotating recognition signal RNSS in FIG. 3 which maintains state 'LOW' and the output $\overline{Q}$ of the latch 210 on the line 74 becomes the clockwise rotating recognition signal RISS in FIG. 3 which maintains state 'HIGH'.

Since the third pulse train RTP on the line 72 and the counterclockwise rotating recognition signal RNSS on the line 73 are fed to the first NAND gate 220, the output of the first NAND gate 220 on the line 75 become the first control signal RCS in FIG. 4 which maintains state 'HIGH'.

Meanwhile, the third pulse train RTP on the line 72 and the clockwise rotating recognition signal RNSS on the line 74 are fed to the second NAND gate 230, and thus the output of the second NAND gate 230 on the line 76 becomes the clock pulse train RCP in FIG. 4 which is the inverted third pulse train RTP in FIG. 4.

The first control signal RCS on the line 75 and the clock pulse train RCP on the line 76 are then applied to the up terminal UP1 and the down terminal DOWN1 of the first counter 300 respectively. Thus, the first counter 300 outputs through the line 77 the second control signal which has the same logic state as the first control signal, performs down counting at every clock pulse of the clock pulse train RCP, and in turn outputs the borrow over the line 78 and the lower digits for the current position data of the positioning system through the lines 79, 80, 81, 82.

Since the second control signal on the line 77 and the borrow on the line 78 are fed to the up terminal UP2 and the down terminal DOWN2 of the second counter 310, the second counter 310 performs down counting every time when the borrow is applied and outputs through the lines 83, 84, 85, 86 the higher digits for the current position data of the positioning system.

Then, the 8 bits lower and higher digits for the current position data on the lines 79 through 86 are applied to the data bus through the buffer 320.

Meanwhile, the backup power source 40 supplies the power supply $V_{cc}$ to the encoding section 10, the detector section 20 and the counter section 30 which are constituted with C-MOS elements having the characteristics of the low operating voltage and low power consumption.

In a normal state, the external power supply on line 87 is applied through the diode $D_1$ to be used as the main power supply $V_{cc}$ and the main power supply $V_{cc}$ on line 88 is then applied to the sections 10, 20, 30. The external power supply is also applied and charged to the battery 400 with its voltage lowered to the predetermined level by the resistor $R_3$ and the diodes $D_3$ and $D_4$ connected in series. At this time, the diode $D_2$ remains off because the voltage of the main power supply $V_{cc}$ on the line 88 is higher than that of the lowered power supply on the line 89.

On the other hand, in case of power interruption, the external power supply on the line 87 becomes off and the voltage-lowered power supply current charged in the battery 400 is applied to the sections 10, 20, 30 through the diode $D_2$. Therefore, the current position data of the positioning system can continuously be monitored and detected even in case of power interruption.

From the foregoing, it will be apparent that the present invention makes it possible to monitor and detect the current position of the positioning system continuously even in case of power interruption and thus makes it possible to perform the position control of the positioning system without returning the positioning system to the original position when the power interruption ends. Furthermore, the present invention can easily be employed to the positional control device utilizing a motor of small size since the present invention is constituted with C-MOS elements.

What is claimed is:

1. An electronic absolute coordinate encoder for a positional control device having a motor, comprising:
    an encoder for sensing the current position of the positioning system and generating a first pulse train and a second pulse train which is advanced or delayed for a predetermined phase difference relative to the first pulse train in dependence upon the rotational direction of said motor;
    a detector for detecting the rotational direction of said motor according to the phase delay or phase advance of the second pulse train relative to the first pulse train, and generating a first control signal and a clock pulse train;
    a counter for performing forward or reverse counting of said clock pulse train in dependence upon the logic state of the first control signal, and outputting current position data of said positioning system; and
    a back-up power source supplying a subsidiary power supply having a predetermined voltage level to said encoder, detector and counter for continuous detection of the current position of said positioning system in case of main power interruption.

2. An electronic absolute coordinate encoder for a positional control device having a motor, comprising:
    an encoder for sensing the current position of the positioning system and generating a first pulse train and a second pulse train which is advanced or delayed for a predetermined phase difference relative to the first pulse train in dependence upon the rotational direction of said motor;

a detector for detecting the rotational direction of said motor according to the phase delay or phase advance of the second pulse train relative to the first pulse train, and generating a first control signal and a clock pulse train, the detector comprising:

an AND gate receiving the first and second pulse trains and outputting a third pulse train having a pulse width reduced by said predetermined phase difference between the first and second pulse trains;

a latch receiving the first and second pulse trains into its clock input terminal and its data input terminal, respectively, latching the logic state of the second pulse train in accordance with the first pulse train, and outputting a rotating direction recognition signal and an inverted rotating direction recognition signal through its noninverting and inverting output terminals, respectively;

a first NAND gate receiving the third pulse train and said rotating direction recognition signal, and outputting the first control signal or an inverted third pulse train in dependence upon the logic state of said rotating direction recognition signal; and a second NAND gate receiving the third pulse train and said inverted rotating direction recognition signal, and outputting the inverted third pulse train or the first control signal in dependence upon the logic state of said inverted rotating direction recognition signal;

a counter for performing forward or reverse counting of said clock pulse train in dependence upon the logic state of the first control signal, and outputting current position data of said positioning system; and a back-up power source supplying a subsidiary power supply having a predetermined voltage level to said encoder, detector and counter for continuous detection of the current position of said positioning system in case of main power interruption.

* * * * *